(12) United States Patent
Arad et al.

(10) Patent No.: US 8,160,080 B1
(45) Date of Patent: Apr. 17, 2012

(54) IMPLEMENTATION OF RELIABLE SYNCHRONIZATION OF DISTRIBUTED DATABASES

(75) Inventors: Nir Arad, Nesher (IL); Carmi Arad, Nofit (IL); David Melman, D.N. Bikat Beit Hakerem (IL)

(73) Assignee: Marvell Israel (M.I.S.L.) Ltd. (IL)

( * ) Notice: Subject to any disclaimer, the term of this patent is extended or adjusted under 35 U.S.C. 154(b) by 799 days.

(21) Appl. No.: 11/430,592

(22) Filed: May 8, 2006

(51) Int. Cl.
*H04L 12/56* (2006.01)
(52) U.S. Cl. ...................................................... 370/401
(58) Field of Classification Search .................. 370/401, 370/402, 389, 392, 394, 474, 475, 476
See application file for complete search history.

(56) References Cited

U.S. PATENT DOCUMENTS

| 5,909,686 | A * | 6/1999 | Muller et al. | 707/104.1 |
| 6,810,037 | B1 * | 10/2004 | Kalapathy et al. | 370/392 |
| 2005/0141537 | A1 * | 6/2005 | Kumar et al. | 370/429 |
| 2005/0147094 | A1 * | 7/2005 | Malalur | 370/389 |
| 2006/0036765 | A1 * | 2/2006 | Weyman | 709/245 |
| 2006/0056412 | A1 * | 3/2006 | Page | 370/392 |

* cited by examiner

*Primary Examiner* — Dang Ton
*Assistant Examiner* — Nourali Mansoury
(74) *Attorney, Agent, or Firm* — Brinks Hofer Gilson & Lione (57) ABSTRACT

A method of controlling a plurality of forwarding databases provided in an Ethernet bridge having a plurality of devices. The method includes aging a first set of entries in a first forwarding database maintained by a first one of the plurality of devices. The first set of entries are owned by the first one of the plurality of devices. The method also includes transmitting one or more new address messages from the first one of the plurality of devices to a second one of the plurality of devices. The method further includes aging a second set of entries in the first forwarding database. The second set of entries are owned by the second one of the plurality of devices.

24 Claims, 4 Drawing Sheets

IMPLEMENTATION OF RELIABLE SYNCHRONIZATION OF DISTRIBUTED DATABASES

BACKGROUND OF THE INVENTION

The use of Ethernet bridges to provide connections between local area networks (LANs) or wide area networks (WANs) is well known. Generally a bridge connects similar LANs at the Layer 2 level. Among other components, an Ethernet bridge contains a bridge forwarding database that is used in switching network traffic processed by the bridge. Some bridges are centralized and operate as a single entity or device. In these centralized bridges, all the packets are received by the single entity, which makes the bridging decisions utilizing a centralized forwarding database. Other bridges contain multiple devices, with each device including one or more packet processors. In some systems, the packet processors are application specific integrated circuits (ASICs) customized to perform Ethernet bridging functions.

In multi-device bridges, each device is typically a multi-port device capable of receiving and forwarding packets at any of the device ports. An example of such a multi-device bridge is a bridge configured as a single chassis with multiple devices in the form of line card blades in the chassis. Alternatively, a bridge with multiple devices may be configured in a stacked configuration. Preferably, the multi-device bridge is configured and operated as a single entity, although it contains multiple devices. Accordingly, the devices in such a multi-device bridge each maintain an independent or separate forwarding database to support independent bridging functionality. Each device makes independent bridging decisions based, in part, on the data maintained in the device's forwarding database. Thus, a multi-device bridge may be considered as including a distributed forwarding database.

In order to reliably process network traffic, the various forwarding databases maintained by the devices are synchronized, preferably providing each independent device with the same copy of the same database at all times. Thus, a multi-device bridge with distributed and synchronized forwarding databases is able to operate as a single bridging entity. For example, when a new station, such as a laptop, connects to a port of a particular device and joins the network, the MAC address of the laptop is learned by the particular device to which the laptop is connected. Then the particular device provides information related to the new station to the other devices in the bridge, which update their respective forwarding databases with the new MAC address of the laptop. On the other hand, when a station leaves the network, the Ethernet bridging standards provide for address aging so that the MAC address of the station will not consume unnecessary network resources, such as memory, in the forwarding databases maintained by each of the devices in the bridge. Thus, once a station leaves the network, its MAC address should be deleted from the forward databases of all the devices in the network. In practice, the synchronization of such a distributed forwarding database is problematic in the context of mobile users and varying station connections. Thus, there is a need in the art for methods and systems to reliably synchronize the independent forwarding databases making up the distributed database in a multi-device bridge.

SUMMARY OF THE INVENTION

According to the present invention, methods of managing network appliances are provided. More particularly, the invention provides methods and systems for synchronizing a distributed forwarding database in a multi-device bridge. Merely by way of example, the invention has been applied to a method of aging all the database entries provided in a forwarding database. But it would be recognized that the invention has a much broader range of applicability.

According to an embodiment of the present invention, a method of controlling a plurality of forwarding databases provided in an Ethernet bridge having a plurality of devices is provided. The method includes aging a first set of entries in a first forwarding database maintained by a first one of the plurality of devices. The first set of entries are owned by the first one of the plurality of devices. The method also includes transmitting one or more new address messages from the first one of the plurality of devices to a second one of the plurality of devices. The method further includes aging a second set of entries in the first forwarding database. The second set of entries are owned by the second one of the plurality of devices.

According to another embodiment of the present invention, a method of aging entries in a distributed forwarding database of an Ethernet bridge having N devices is provided. The method includes retrieving an entry from a first memory storing a first instance of the distributed forwarding database. The first instance is associated with a first device of the N devices. The method also includes determining that a station associated with the entry is owned by a second device of the N devices, comparing the entry to a remote threshold value, and increasing the entry by a predetermined increment if the entry is less than the remote threshold value. The method further includes deleting the entry from the first instance of the distributed forwarding database if the entry is greater than or equal to the remote threshold value.

According to yet another embodiment of the present invention, a bridge having N devices is provided. Each of the N devices has a corresponding forwarding database. The bridge includes a first memory in communication with one of the N devices. The memory is adapted to store a plurality of records. A first record includes a MAC address entry associated with a station in communication with the one of the N devices and a multi-bit aging entry associated with the station. A second record includes another MAC address entry associated with another station in communication with another of the N devices and a multi-bit aging entry associated with the another station. The bridge also includes a second memory storing a configurable local threshold value associated with the station and a third memory storing a configurable remote threshold value associated with the another station.

According to an alternative embodiment of the present invention, an Ethernet bridge having a plurality of devices is provided. The Ethernet bridge includes one or more memories storing a plurality of forwarding databases. Each of the plurality of forwarding databases corresponds to one of the plurality of devices. The Ethernet bridge also includes an aging engine adapted to age a first set of entries in a first forwarding database maintained by a first one of the plurality of devices. The first set of entries are owned by the first one of the plurality of devices. The aging engine is also adapted to age a second set of entries in the first forwarding database. The second set of entries are owned by a second one of the plurality of devices. The aging engine includes a transmitter configured to transmit one or more new address messages from the first device to the second device.

According to another alternative embodiment of the present invention, an Ethernet bridge having N devices is provided. The Ethernet bridge includes one or more memories storing a plurality of instances of a distributed forwarding database. The Ethernet bridge also includes an aging engine.

The aging engine includes a memory interface adapted to retrieve an entry from a first memory storing a first instance of the distributed forwarding database. The first instance is associated with a first device of the N devices. The memory interface is also adapted to determine that a station associated with the entry is owned by a second device of the N devices. The aging engine also includes a comparing engine adapted to compare the entry to a remote threshold value, an incrementing engine adapted to increase the entry by a predetermined increment if the entry is less than the remote threshold value, and a deleting engine adapted to delete the entry from the first instance of the distributed forwarding database if the entry is greater than or equal to the remote threshold value.

According to yet another alternative embodiment of the present invention, a method of managing a distributed forwarding database included in a bridge having N devices is provided. Each of the N devices has a corresponding forwarding database. The method includes accessing a first memory in communication with one of the N devices. The memory stores a plurality of records. A MAC address entry associated with a station in communication with the one of the N devices and a multi-bit aging entry associated with the station are stored in a first record. Additionally, another MAC address entry associated with another station in communication with another of the N devices and a multi-bit aging entry associated with the another station are stored in a second record. The method also includes storing a configurable local threshold value associated with the station in a second memory and storing a configurable remote threshold value associated with the another station in a third memory.

According to a specific embodiment of the present invention, an Ethernet bridge having a plurality of devices is provided. The Ethernet bridge includes means for aging a first set of entries in a first forwarding database maintained by a first one of the plurality of devices. The first set of entries are owned by the first one of the plurality of devices. The Ethernet bridge also includes means for transmitting one or more new address messages from the first one of the plurality of devices to a second one of the plurality of devices. The Ethernet bridge further includes means for aging a second set of entries in the first forwarding database. The second set of entries are owned by the second one of the plurality of devices.

According to another specific embodiment of the present invention, an Ethernet bridge having a plurality of devices is provided. The Ethernet bridge includes means for retrieving an entry from a first memory storing a first instance of the distributed forwarding database. The first instance is associated with a first device of the N devices. The Ethernet bridge also includes means for determining that a station associated with the entry is owned by a second device of the N devices, means for comparing the entry to a remote threshold value, and means for increasing the entry by a predetermined increment if the entry is less than the remote threshold value. The Ethernet bridge further includes means for deleting the entry from the first instance of the distributed forwarding database if the entry is greater than or equal to the remote threshold value.

According to yet another specific embodiment of the present invention, a bridge having N devices is provided. Each of the N devices has a corresponding forwarding database. The bridge includes means for accessing a first memory in communication with one of the N devices. The memory stores a plurality of records. A MAC address entry associated with a station in communication with the one of the N devices and a multi-bit aging entry associated with the station are stored in a first record. Additionally, another MAC address entry associated with another station in communication with another of the N devices and a multi-bit aging entry associated with the another station are stored in a second record. The bridge also includes means for storing a configurable local threshold value associated with the station in a second memory and means for storing a configurable remote threshold value associated with the another station in a third memory.

Still other embodiments of the present invention may be implemented in code, for example, by a digital signal processor (DSP). One such embodiment includes code for aging a first set of entries in a first forwarding database maintained by a first device. The first set of entries are owned by the first device. The embodiment also includes code for transmitting one or more new address messages from the first device to a second device. The embodiment further includes code for aging a second set of entries in the first forwarding database. The second set of entries are owned by the second device.

In another embodiment implemented in code, for example, by a DSP, a method of operating an Ethernet bridge having a plurality of devices is provided. The embodiment includes code for retrieving an entry from a first memory storing a first instance of the distributed forwarding database. The first instance is associated with a first device of the N devices. The embodiment also includes code for determining that a station associated with the entry is owned by a second device of the N devices, code for comparing the entry to a remote threshold value, and code for increasing the entry by a predetermined increment if the entry is less than the remote threshold value. The embodiment further includes code for deleting the entry from the first instance of the distributed forwarding database if the entry is greater than or equal to the remote threshold value.

In yet another embodiment implemented in code, a bridge having N devices is provided. Each of the N devices has a corresponding forwarding database. The embodiment includes code for accessing a first memory in communication with one of the N devices. The memory stores a plurality of records. A MAC address entry associated with a station in communication with the one of the N devices and a multi-bit aging entry associated with the station are stored in a first record. Additionally, another MAC address entry associated with another station in communication with another of the N devices and a multi-bit aging entry associated with the another station are stored in a second record. The embodiment also includes code for storing a configurable local threshold value associated with the station in a second memory and code for storing a configurable remote threshold value associated with the another station in a third memory.

Many benefits are achieved by way of the present invention over conventional techniques. For example, embodiments of the present invention provide for recovery from lost aged address messages, thereby preventing the presence of stale entries in forwarding databases and conserving memory resources provided in the bridge. Additionally, the granularity of aging times is improved, providing better aging accuracy. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

Figure 1:
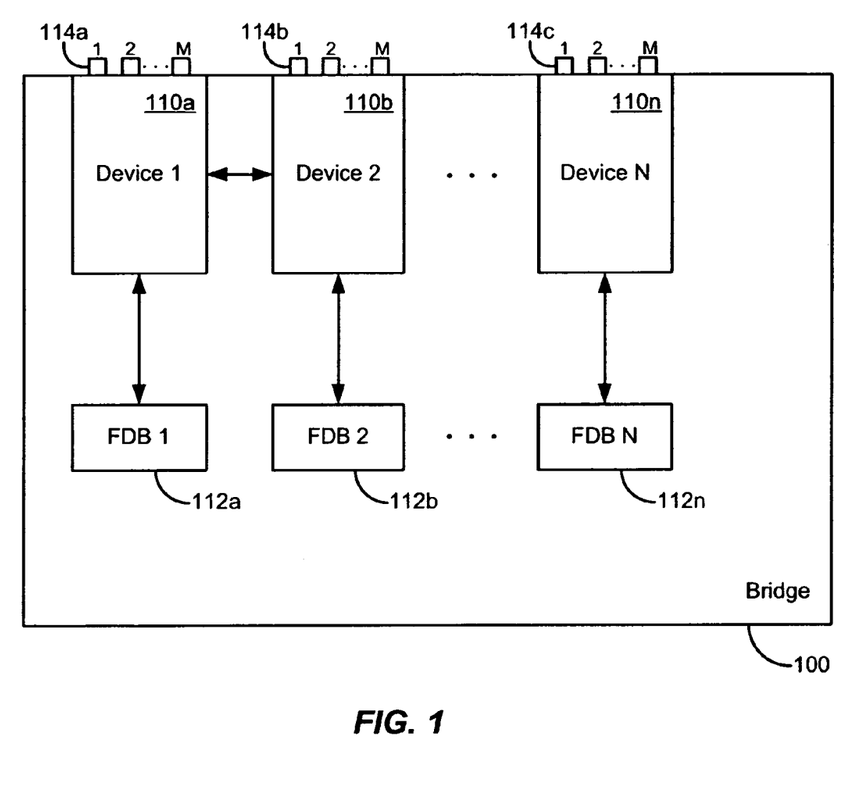
FIG. 1 is a simplified schematic diagram of a multi-device bridge according to an embodiment of the present invention.

FIG. 1 is a simplified schematic diagram of a multi-device bridge according to an embodiment of the present invention. The bridge 100 includes a number of devices 110a through 110n. As illustrated in FIG. 1, N devices are provided in the bridge. In an exemplary bridge, 8 devices are provided, although embodiments of the present invention are not limited to this particular number. Each of the devices is in communication with a forwarding database (FDB) 112. The FDBs are stored in one or more memories associated with a particular device. The FDBs are also numbered 1 through n in FIG. 1 for purposes of clarity. Each device has a corresponding FDB and maintains its own FDB for its own ports. Thus, implementation of the methods and systems described herein provides for scalability of network bandwidth since a number of devices can be added to the system or bridge without adversely impacting system performance. Additionally, embodiments of the present invention provide methods and systems to synchronize the multiple FDBs 112 provided in the bridge 100.

An embodiment of the present invention provides a method that includes a process of learning new entries in a bridge FDB. A new address is learned as owned by one device, to be designated as its owner, and as unowned by the other devices. The method also includes a robust distributed aging process. The aging process includes two types of operations. One type of operation is applied to owned entries, and the other type of operation is applied to unowned entries. The method is robust in that it enables graceful recovery over time from the loss of one or a few messages in the system.

Each of the devices 110 includes multiple ports 114. Referring to FIG. 1, a total of M ports are provided for each device, although in general, the number of ports for each device may vary, even within the same bridge. These ports are utilized for ingress and egress of packet traffic to/from the device and the network. As will be evident to one of skill in the art, a station, such as a laptop computer, connects to one of the ports 114, thereby enabling the station to transmit and receive packet traffic over the network. Additional stations, other bridges, and the like are connected to the various ports of the bridge 100.

Figure 2:
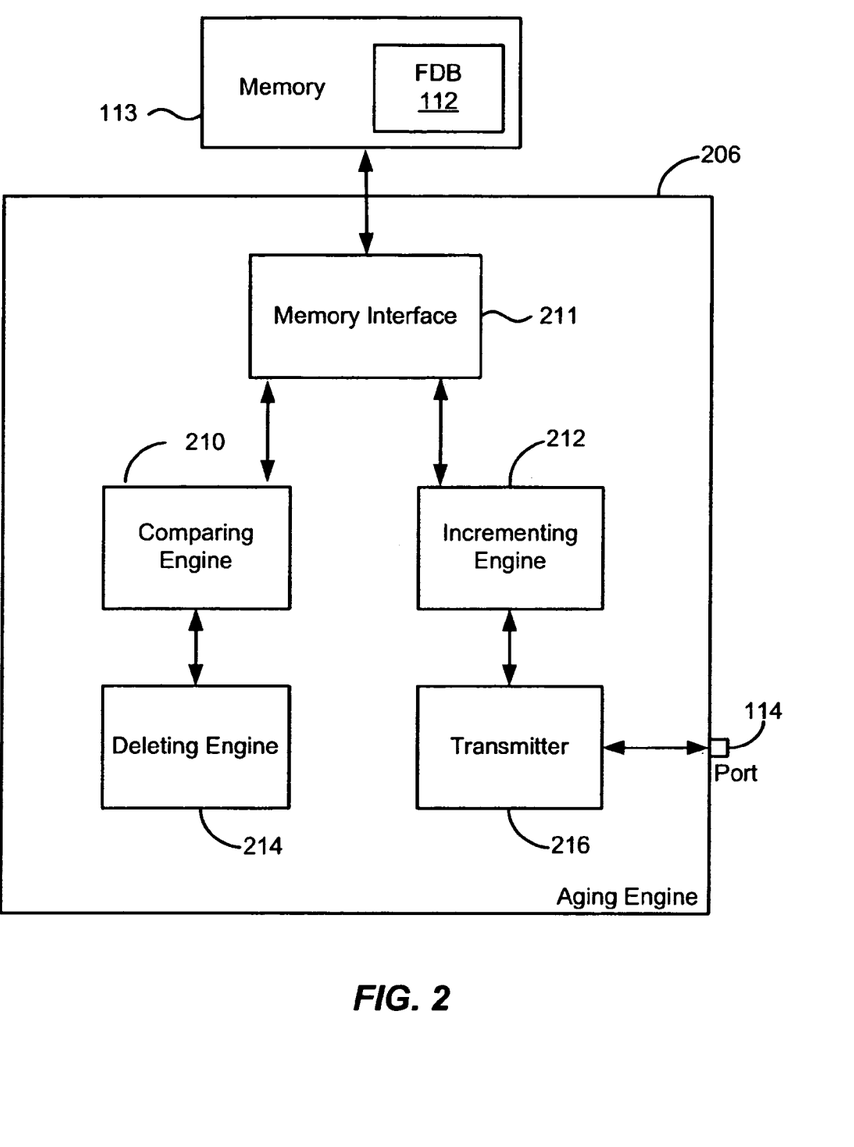
FIG. 2 is a simplified schematic diagram of an aging engine according to an embodiment of the present invention.

FIG. 2 is a simplified schematic diagram of an aging engine according to an embodiment of the present invention. The aging engine may be provided in one or more of the processors included in a device. Merely by way of example, the aging engine 206 includes a number of functional blocks, which may be implemented in hardware. These functional blocks include a memory interface 211 adapted to retrieve information from the FDB 112 stored in memory 113. The memory interface 211 also provides the capability to determine ownership of stations associated with an entry in the FDB 112, for example, that a particular station is owned by a particular device. As illustrated in FIG. 2, the memory is external to the processor, although the memory 113 may alternatively be internal to the aging engine (not shown).

Moreover, the aging engine includes a comparing engine 210 and an incrementing engine 212, which operate in conjunction with data stored in the FDB 112. Additionally, the aging engine includes a deleting engine 214 and a transmitter 216 that delete entries in the FDB 112 and send FDB synchronization messages (e.g., new address, aged address, and the like) over the network, respectively. Although not illustrated in FIG. 2, the aging engine provides additional functions performed by additional functional blocks. One of ordinary skill in the art would recognize many variations, modifications, and alternatives.

Figure 3:
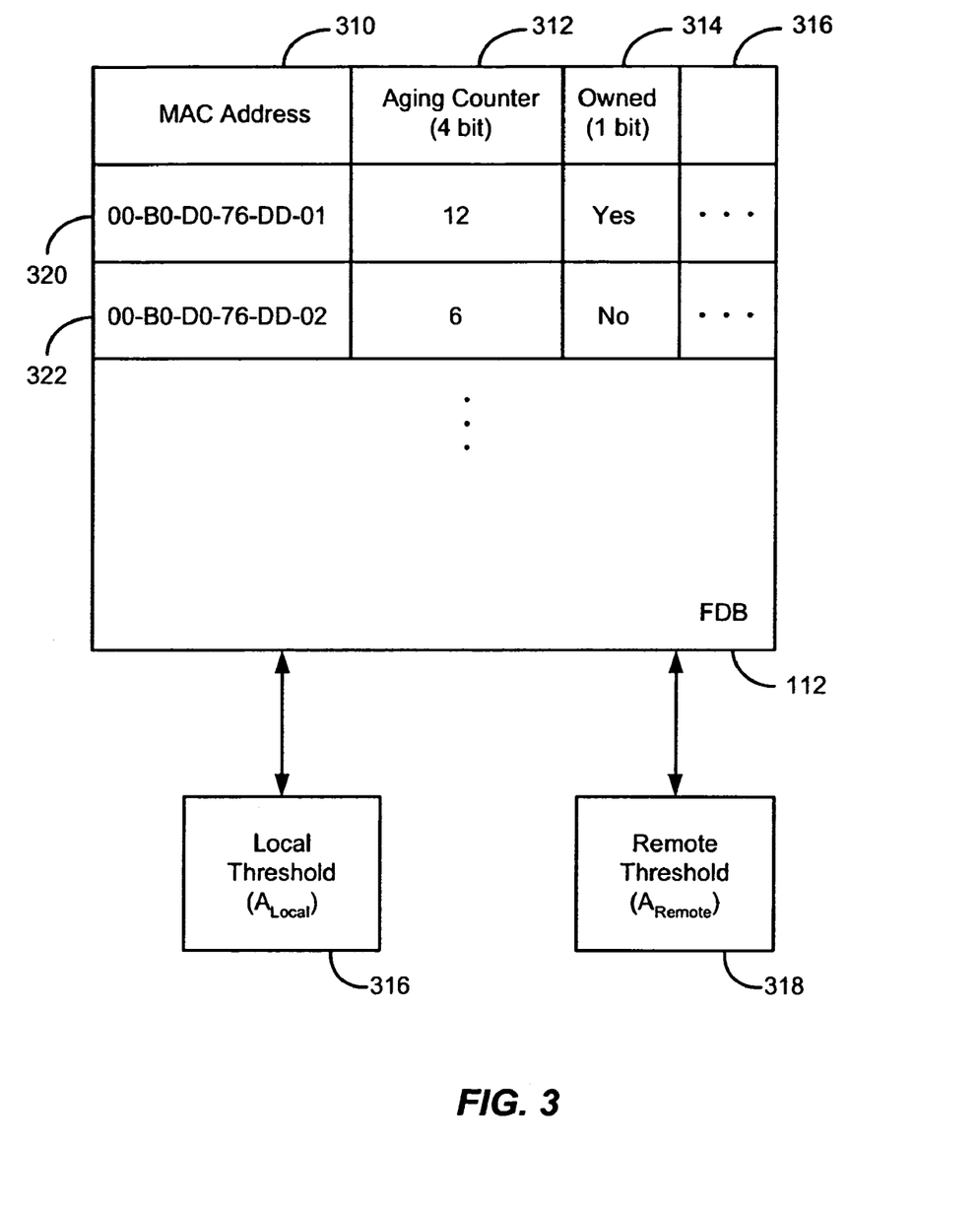
FIG. 3 is a simplified diagram of a forwarding database according to an embodiment of the present invention.

FIG. 3 is a simplified diagram of an FDB according to an embodiment of the present invention. The FDB 112 includes a number of FDB entries or records, with an FDB entry provided for each station attached to the various ports of the device. The FDB entries include several fields: the MAC Address 310 of the station, an Aging Counter 312' for the station, and an ownership indication ("Owned") 314. An FDB entry is associated with a single network host (or station). Additional fields 316 are provided in the FDB as appropriate to the particular applications.

For entry 320, the MAC address of the station is 00-B0-D0-76-DD-01 and the Aging Counter is equal to 12 at the illustrated point in time. The ownership indication for this station is "Yes." A "Yes" in field 314 indicates that entry 320 is owned by the local device since the network host is physically connected to the packet processor device associated with the FDB illustrated in FIG. 3. Entry 322 represents a station that is not owned by the device associated with the FDB illustrated in FIG. 3. Accordingly, the ownership indication for entry 322 is "No." Of course, as shown in FIG. 3, the "Owned" column in the FDB is a single bit field; with 1 and 0 representing the ownership indication "Yes" and "No," respectively. Because it is not necessary for the device associated with the FDB 112 illustrated in FIG. 3 to know the identity of the device owning the station associated with entry 322, a single bit field is sufficient and poses no limitations with respect to system scalability.

According to embodiments of the present invention, the Aging Counter provides a predetermined number of counter levels, for example, a four-bit counter providing 16 levels (0-15). For owned entries, the Aging Counter is reset to zero when the station transmits a packet. For stations not owned by the device corresponding to the FDB, the Aging Counter is reset to zero when a New Address message is received from a remote device. The multi-level Aging Counter provided herein contrasts with conventional aging mechanisms, which generally provide only a status flag, i.e., a single age bit with two binary levels. A number of entries associated with various stations are provided in the FDB. For example, the FDB may contain up to or greater than 1K, 8K, 16K, 32K, or 104K entries. As the number of FDB entries increases, the difficulty of controlling the aging time increases, a condition which is addressed by the methods and systems provided by embodiments of the present invention.

In some implementations provided according to embodiments of the present invention, each entry in the database, for example, entry 320 as illustrated in FIG. 3, is owned by a single device, i.e., the device that learned the MAC address associated with the entry. Thus, although an entry is preferably present in all the FDBs in a device, each entry is only owned by one device. For example, if a laptop attaches to port #2 of device #1, the entry for the laptop MAC address will be updated in all the FDBs in the bridge. At the same time, each device in the bridge will know that the laptop MAC address is owned by device #1. As discussed above, it is sufficient that device #1 knows that it owns entry 320 and other devices know they do not. Thus, embodiments of the present invention provide a more scalable approach than conventional techniques.

The devices are adapted to transmit and receive a number of FDB synchronization messages between the devices. For example, there is a New Address message, which is sent by the learning/owning device (e.g., device #1) to all the other devices in the system. The New Address message is used to communicate that a station (e.g., the laptop) associated with a new MAC address has joined the system. Following along with the previous example, if any of the devices in the bridge are to send information to that MAC address, the device should send the packet traffic for the laptop to device #1, port #2. The devices also transmit and receive Aged Address messages, indicating that a station has disconnected from a particular device. For example, if the laptop disconnects from device #1, port #2, an Aged Address message is sent by device #1 to the other devices in the bridge, indicating that the laptop is no longer connected to the network. In response to the Aged Address message, the other devices delete the entry for the MAC address associated with the laptop from their associated FDB.

Additionally, the devices are adapted to send a Query Address message, which is used for determining the MAC address of stations with unknown destination addresses. For example, it is possible that when the laptop connected to device #1, the New Address message sent by device #1 did not reach device #10. This situation may happen for a number of reasons, including the message having been dropped due to congestion on the network, the fabric, or other messaging interface that connects the devices to each other, or for some other reason. Subsequently, if a station connected to device #10 tries to send a message to the MAC address associated with the laptop, device #10 will not have the laptop's MAC address in the FDB associated with device #10. In this event, device #10 will flood the packet to the network, sending the packet as a broadcast to all the ports in the network. Additionally, device #10 will send a Query Address message to all the other devices in the bridge, to determine the MAC address for the laptop. When device #1 receives the Query Address message, it will respond by sending the MAC address associated with the laptop to device #10, which will then update its corresponding FDB.

By both broadcasting the packet to the network and sending a Query Address message, the packet is not kept waiting, thereby reducing buffering requirements in the device. Furthermore, a response to the Query Address message will typically be received before the next packet for the unknown MAC address will be received, so that subsequent packets will be delivered to the determined {port, device}.

Embodiments of the present invention utilize an aging daemon that is implemented in each of the devices in the bridge. The aging daemon is operative to age out the entries in the FDB according to a predetermined process. Conventionally, the aging daemon is implemented in a manner that only ages out entries from an FDB that are owned by the device associated with the particular FDB. For example, returning to the previous example, in a conventional aging daemon, only device #1 may age out the MAC address of the laptop, since the laptop was attached to and learned by device #1 and device #1 thereby owns the laptop.

A conventional aging daemon operates by utilizing an age bit provided in conventional FDBs. The age bit is set to zero every time a station attached to the network transmits a packet. The aging daemon scans the entire FDB repeatedly at a predetermined cycle time. During every pass through the FDB, the age bit is examined by the aging daemon. If the age bit is set to zero, the aging daemon will change the age bit to one. If, during the pass, the aging daemon determines that the age bit is already set to one, the entry will be deleted. As long as the station is connected to the network and transmitting traffic at a sufficient rate, the station will not be aged out. However, in the absence of network activity, an entry will be deleted in two passes of the aging daemon. As described above, when a station is aged out, an Aged Address message is broadcast from the device deleting the entry to all the other devices in the bridge, which then delete the MAC address associated with the aged out station from their corresponding FDB.

If a New Address message is lost, the address of the destination station can be recovered by sending a Query Address message. However, the inventors have determined that if an Aged Address message is lost, conventional devices do not provide any recovery mechanism. The loss of Aged Address messages may serve to contaminate the instances of the distributed FDB over time as old addresses are not removed from each of the device FDBs as the stations are disconnected from the network. Accordingly, embodiments of the present invention provide methods and systems to synchronize distributed FDBs as described throughout the present specification.

An additional drawback of conventional aging daemons realized by the present inventors is the coarse aging times produced by the aging daemons. For example, if an aging daemon scans the FDB every 30 seconds, an entry scanned immediately following the transmission of a packet from the MAC address contained in the entry, may result in the entry being aged out in just over one scan time, i.e., just over 30 seconds. On the other hand, if an entry for a new station is added just after the aging daemon scans the entry location, in the absence of network activity, the new entry will not be aged out for nearly 60 seconds. In contrast with conventional aging techniques, embodiments of the present invention provide an aging daemon with increased control over the granularity of aging processes.

Figure 4:
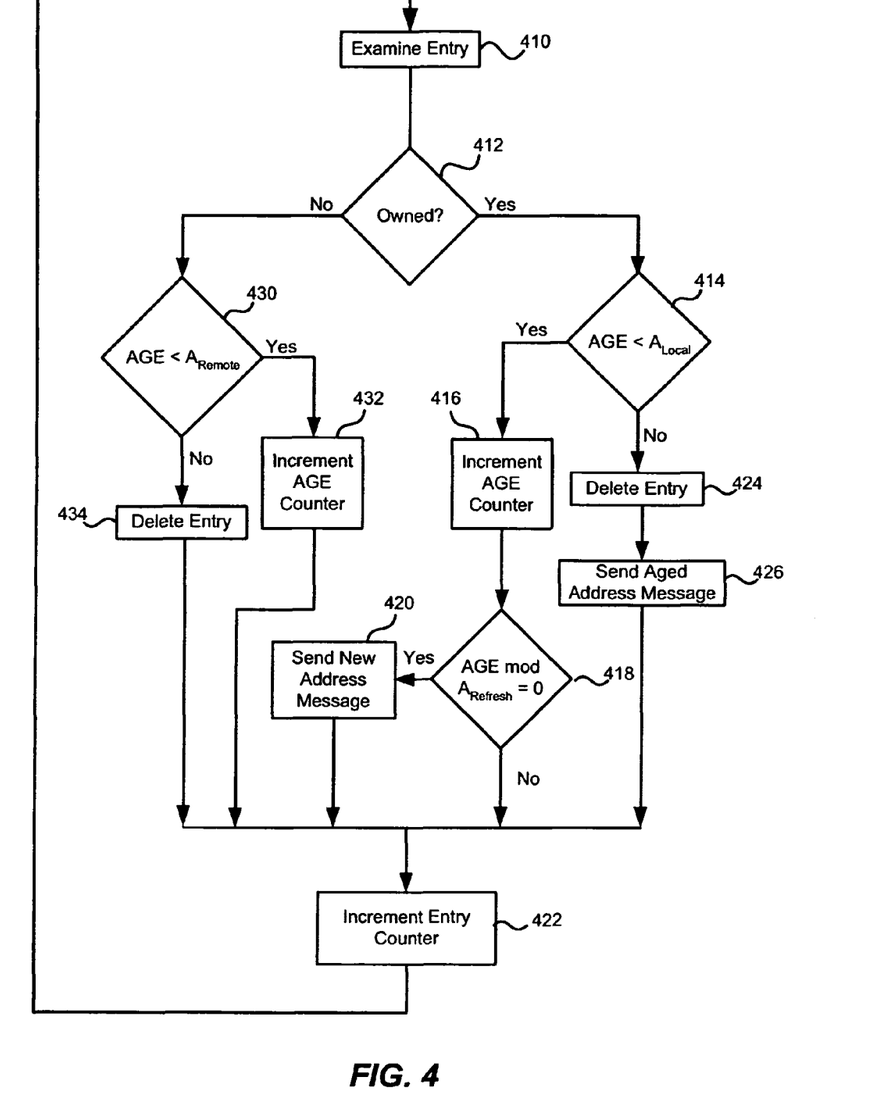
FIG. 4 is a simplified flowchart illustrating a method of synchronizing distributed forwarding databases according to an embodiment of the present invention.

FIG. 4 is a simplified flowchart illustrating a method of synchronizing distributed forwarding databases according to an embodiment of the present invention. An aging daemon scans a FDB, for example one of the FDBs 112 illustrated in FIG. 1. An entry is examined (410). A determination is made (412) if the entry is owned by the device corresponding to the FDB being scanned. This determination may be made by referring to the ownership indication field. For example, if FDB #1 is being scanned, a determination is made if the entry is owned by device #1. In contrast with conventional aging daemons, embodiments of the present invention enable all devices in the bridge to age out all the entries in the FDB, regardless of whether or not the entry is owned by the particular device. As will be described more fully below, allowing a device to age out all entries in its corresponding FDB provides for recovery in situations in which an Aged Address message is lost. According to embodiments of the present invention, it is not necessary for a specific device to determine the identity of the device owning a particular entry, merely that a particular entry is not owned by the specific device.

Additionally, to avoid removal of valid entries, the owner of the MAC address refreshes the status of valid entries on a periodic basis by sending New Address messages for the stations owned by the device. In embodiments, the timing of New Address message refreshing process is a function of a variable, $A_{Refresh}$. Additional discussion related to $A_{Refresh}$ is provided with respect to FIG. 4. For example, device #1 will periodically send New Address messages regarding the laptop attached to port #2. This periodic refreshing process will prevent other devices in the bridge from aging out the laptop. Our calculations have shown that additional network traffic resulting from the periodic generation of New Address messages is trivial, amounting to a fraction of 1% of the overall traffic capacity of the network fabric. Of course, this calculation was computed for a specific implementation, with a given number of FDB entries and inter-device communication capacity. It should be noted that once the owning device stops sending out the New Address messages for a particular MAC address, the station associated with that MAC address will eventually be aged out of all devices in the bridge and the several instances of the distributed FDB will become synchronized.

Referring to FIG. 3, a local threshold value ($A_{Local}$) 316 and a remote threshold value ($A_{Remote}$) 318 are provided by embodiments of the present invention. Thus, bridge 100 maintains two threshold values, e.g. by storing them in additional memory. These threshold values may be stored in a centralized memory included in the bridge. Additionally, local threshold value ($A_{Local}$) 316 and remote threshold value ($A_{Remote}$) 318 are fixed or "hard wired" into the aging logic or various processing engines in alternative embodiments. One of ordinary skill in the art would recognize many variations, modifications, and alternatives. The local and remote threshold values provide for graduated levels of resolution for comparison with values stored in the Aging Counter. According to embodiments of the present invention, the Aging Counter is reset to zero each time a packet is transmitted from the station associated with an entry.

As illustrated in FIG. 4, if the entry is owned by the device corresponding to the FDB being scanned, the value in the Aging Counter, represented by the variable AGE (see field 312 in FIG. 3) is compared to the local threshold value ($A_{Local}$) stored in memory 316. In particular, a determination is made (414) if AGE is less than $A_{Local}$. If the value in the Aging Counter is less than the local threshold value, then the Aging Counter is incremented (416). After the Aging Counter is incremented, a determination is made (418) if AGE modulo $A_{Refresh}$ is equal to zero (i.e., if AGE is an exact multiple of $A_{Refresh}$). If AGE modulo $A_{Refresh}$=0, then a New Address message is sent (420). Comparing the Aging Counter to a multiple of $A_{Refresh}$ enables embodiments of the present invention to recover from lost New Address messages, as well as to prevent remote parties from aging out entries. After the New Address message is sent, an Entry Counter is incremented (422) and the process of scanning the FDB continues. If, on the other hand, AGE modulo $A_{Refresh}$≠0, the process continues to the incrementing of the Entry Counter (422). This process is followed when the time between either the adding of an owned entry to the database or the transmission of a packet from the owned entry is less than the local threshold value times the aging daemon scan time. For example, if the local threshold value is equal to 12 ($A_{Local}$=12) and the scan time is 4 seconds per scan, a scan following the transmission of a packet will increment the Aging Counter 11 times (a total scan time of 44 seconds) before the test 414 is failed. Of course, transmission of a packet will result in the resetting of the Aging Counter to zero.

If the value stored in the Aging Counter is greater than or equal to the local threshold value, then the entry is deleted (424) and aged out. After aging out a local entry, an Aged Address message is sent to the other devices in the bridge (426). The Entry Counter is incremented (422) and the next entry in the FDB is examined (410). It will be appreciated that a local or owned entry is not aged out until the value in the Aging Counter reaches the local threshold value. Additionally, Aged Addresses messages are only sent for entries owned by a device.

The aging daemon scans the database at a fraction (F) of the required aging time (T), for example F=T/8. Accordingly, the time required to age out a local entry will be between T and F+T. For example, if the FDB is scanned at 8 times a conventional speed, the aging time for a local entry would be between T and 9/8 T, providing improved accuracy compared to the aging time resolution of one or two scan times.

If the entry is not owned by the device corresponding to the FDB, the value stored in the Aging Counter is compared to the remote threshold value ($A_{Remote}$) stored in memory 318. In particular, a determination is made (430) if AGE is less than $A_{Remote}$. If the value in the Aging Counter is less than the remote threshold value, then the Aging Counter is incremented (432), the Entry Counter is incremented (422) and the process of scanning the FDB continues. This process is followed when the time between the receipt of a New Address message for the entry is less than the remote threshold value times the aging daemon scan time. For example, if the remote threshold value is equal to 8 ($A_{Remote}$=8) and the scan time is 4 seconds per scan, a scan following the transmission of a packet will increment the Aging Counter seven times (a total scan time of 44 seconds) before the test 430 is failed. Of course, receipt of a New Address message will result in the resetting of the Aging Counter to zero.

In contrast with local addresses, transmission of a packet from an originating host will not result in resetting of the Aging Counter to zero. Rather, the Aging Counter is reset to zero in response to the periodic refresh process through which the owning device keeps sending New Address messages for addresses which are already learned. Assuming that the refresh process is performed every F×$A_{Refresh}$ seconds, one loss of a New Address message would be prevented by setting $A_{Remote}$ equal to twice or three times $A_{Refresh}$. However, since $A_{Remote}$ is typically less than $A_{Local}$, since once an entry is deleted in the owner device, and it Aged Address message is lost, we would be glad to clear the FDB from this stale entry ASAP.

If the value stored in the Aging Counter is greater than or equal to the remote threshold value, then the entry is deleted (434). The Entry Counter is incremented (422) and the next entry in the FDB is examined (410). It will be appreciated that a remote or unowned entry is not aged out until the value in the Aging Counter reaches the remote threshold value. According to embodiments of the present invention, the local and remote threshold values are configurable as appropriate to the particular applications. In the example above, the remote threshold value is less than the local threshold value, since once an entry is deleted in the owner device, and the Aged Address message is lost, it is preferable to clear the stale entry from the FDB as soon as possible. Merely by way of example, in some implementations, $A_{Remote}$ is less than $A_{Local}$ by one or more scan times (F). In a specific example, $A_{Local}$=10 and $A_{Remote}$=8. Of course, these configurable values are set in accordance with the particular application.

When a New Address message is received, the AGE variable stored in the Aging Counter for the entry is reset to zero. It should be noted that if the entry is unowned, no Aged Address message is sent out when the entry is aged out. Each of the independent FDBs will age out unowned entries individually, preventing the retention of entries associated with stations that have been disconnected, but for which an Aged Address message was lost.

It is understood that the various functional blocks otherwise referred to herein as processors, engines, and the like, including those shown in FIG. 2, may be included in one or more general purpose processors configured to execute instructions and data. In some embodiments, such blocks may be carried out using dedicated hardware such as an application specific integrated circuit (ASIC). In yet other embodiments, such blocks and the processing of the packets may be carried out using a combination of software and hardware. As an example, such processors include dedicated circuitry, ASICs, combinatorial logic, other programmable processors, combinations thereof, and the like. Thus, processors as provided herein are defined broadly and include, but are not limited to packet processors adapted to manage network traffic.

The above description of exemplary embodiments of the invention has been presented for the purposes of illustration and description. It is not intended to be exhaustive or to limit the scope of the invention, which is set forth in the following claims, to the precise form described. Many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of aging out entries in one or more forwarding databases used in processing network traffic, the method comprising:
   accessing an entry in the one or more forwarding databases;
   using a first criterion to age out the entry if the entry is owned by a first device; and
   using a second criterion to age out the entry if the entry is not owned by the first device,
   wherein the first criterion is different from the second criterion,
   wherein using the first criterion to age out the entry if the entry is owned by a first device comprises using a local threshold value to age out the entry if the entry is owned by the first device,
   wherein using the second criterion to age out the entry if the entry is not owned by the first device comprises using a remote threshold value to age out the entry if the entry is not owned by the first device, and
   wherein using the first criterion to age out the entry comprises:
      comparing the entry to a local threshold value;
      incrementing the entry by a predetermined value if the entry is less than the local threshold value;
      deleting the entry if the entry is greater than or equal to the local threshold value; and
      transmitting an aged address message from the device to a second device if the entry of the first set of entries is greater than or equal to the local threshold value.

2. The method of claim 1 further comprising transmitting one or more new address messages on a periodic basis.

3. The method of claim 1 further comprising examining the entry to determine whether the entry is owned by the first device.

4. The method of claim 1 further comprising determining that the entry is owned by the first device when a station associated with the entry is connected to the first device.

5. The method of claim 1 wherein aging out entries in one or more forwarding databases used in processing network traffic comprises aging out entries in a first set of entries owned by the first device and associated with a station owned by the first device.

6. The method of claim 1 wherein using the local threshold value to age out the entry if the entry is owned by a first device comprises using a configurable local threshold value to age out the entry if the entry is owned by a first device.

7. The method of claim 1 further comprising setting the local threshold value to be less than the remote threshold value.

8. The method of claim 1 wherein the local threshold value is less than the remote threshold value.

9. A network bridge comprising:
   one or more forwarding database;
   one or more processors in communication with the one or more forwarding databases and configured to:
      access an entry in the one or more forwarding databases;
      use a first criterion to age out the entry if the entry is owned by a first device; and
      use a second criterion that is different from the first criterion to age out the entry if the entry is not owned by the first device, and
   an aging engine comprising:
      a comparing engine that compares the entry of a first set of entries to the first criterion, wherein the first criterion is a local threshold value associated with stations owned by the first device, the local threshold value being indicative of an age at which the first set of entries associated with the first station is deleted from the first forwarding database maintained by the first device;
      an incrementing engine that increments the entry of the first set of entries by a predetermined value if the entry is less than the local threshold value; and
      a deleting engine that deletes the entry of the first set of entries from the first forwarding database if the entry is greater than or equal to the local threshold value, wherein a transmitter transmits an aged address message from the first device to the second device if the entry is greater than or equal to the local threshold value.

10. The bridge of claim 9 wherein the one or more processors are configured to use the first criterion and the second criterion by using a local threshold value and a remote threshold value.

11. The bridge of claim 10 wherein the one or more forwarding databases are stored in one or more memory devices.

12. The bridge of claim 11 wherein the one or more processors are configured to access the entry by accessing a multi-bit aging field.

13. The bridge of claim 12 wherein the one or more processors are configured to access the multi-bit aging field by accessing a four-bit counter.

14. The bridge of claim 12 wherein the one or more processors are configured to access the entry by accessing an ownership indication field.

15. The bridge of claim 9 wherein each of the one or more processors comprises an application specific integrated circuit configured to:
   access the entry in the one or more forwarding databases;
   use the first criterion to age out the entry if the entry is owned by the first device; and
   use the second criterion that is different from the first criterion to age out the entry if the entry is not owned by the first device.

16. The bridge of claim 9 wherein each of the one or more processors comprises combinatorial logic configured to:
   access the entry in the one or more forwarding databases;
   use the first criterion to age out the entry if the entry is owned by the first device; and
   use the second criterion that is different from the first criterion to age out the entry if the entry is not owned by the first device.

17. A network bridge having at least a first device and a second device, the network bridge comprising:
- one or more memories storing a first forwarding database corresponding to the first device and a second forwarding database corresponding to the second device;
- an aging engine of the first device of a plurality of devices configured to:
- age out based on a first criterion a first set of entries in the first forwarding database maintained by the first device, wherein the first set of entries is associated with a first station that is owned by the first device, and
- age out based on a second criterion that is different than the first criterion a second set of entries in the first forwarding database maintained by the first device, wherein the second set of entries is associated with a second station that is owned by the second device of the plurality of devices,
- wherein the aging engine comprises:
  - a comparing engine that compares an entry of the first set of entries to the first criterion, wherein the first criterion is a local threshold value associated with stations owned by the first device, the local threshold value being indicative of an age at which the first set of entries associated with the first station is deleted from the first forwarding database maintained by the first device;
  - an incrementing engine that increments the entry of the first set of entries by a predetermined value if the entry is less than the local threshold value; and
  - a deleting engine that deletes the entry of the first set of entries from the first forwarding database if the entry is greater than or equal to the local threshold value, wherein a transmitter transmits an aged address message from the first device to the second device if the entry is greater than or equal to the local threshold value.

18. The network bridge of claim 17 further comprising the transmitter that transmits one or more new address messages from the first device to the second device.

19. The network bridge of claim 18 wherein the transmitter is configured to transmit one or more new address messages that are associated with stations coupled to ports of the first device.

20. The network bridge of claim 18 wherein the transmitter is configured to transmit the one or more new address messages on a periodic basis.

21. The network bridge of claim 17 wherein the comparing engine compares an entry of the second set of entries to the second criterion, wherein the second criterion is a remote threshold value, and
- wherein the incrementing engine increments the entry of the second set of entries by a predetermined value if the entry is less than the remote threshold value, and
- wherein the deleting engine deletes the entry of the second set of entries from the first forwarding database if the entry is greater than or equal to the remote threshold value.

22. The network bridge of claim 21 wherein the comparing engine is configured to compare an entry of the first set of entries to a configurable local threshold value and to compare an entry of the second set of entries to a configurable remote threshold value.

23. The network bridge of claim 21 wherein the comparing engine is configured to compare an entry of the first set of entries to the local threshold value and to compare an entry of the second set of entries to the remote threshold value; and
- wherein the local threshold value is less than the remote threshold value.

24. The network bridge of claim 21 wherein the comparing engine is configured to compare an entry of the first set of entries to the local threshold value and to compare an entry of the second set of entries to the remote threshold value wherein the local threshold value is greater than the remote threshold value.

* * * * *